Oct. 5, 1965 J. B. STEWART ETAL 3,210,083

PHONOGRAPH RECORD PLAYING DEVICE

Filed May 21, 1963 2 Sheets-Sheet 1

Fig. I.

WITNESSES:
Bernard R. Gieguey
James F. Young

INVENTORS
James B. Stewart and
George P. Roegner.
BY [signature]
ATTORNEY

Oct. 5, 1965 J. B. STEWART ETAL 3,210,083

PHONOGRAPH RECORD PLAYING DEVICE

Filed May 21, 1963 2 Sheets-Sheet 2

United States Patent Office 3,210,083

Patented Oct. 5, 1965

3,210,083

PHONOGRAPH RECORD PLAYING DEVICE

James B. Stewart, Franklin Township, Somerset County, and George P. Roegner, Brick Township, Ocean County, N.J., assignors to Westinghouse Electric Corporation, Pittsburgh, Pa., a corporation of Pennsylvania Filed May 21, 1963, Ser. No. 281,913

6 Claims. (Cl. 274—39)

This invention relates to a phonograph record playing device and more specifically to an adapter for a record player which is movable to provide a spindle for records having either relatively large center holes or relatively small center holes.

The center spindle of most phonograph record players is dimensioned to receive records having relatively small center holes and more specifically records currently manufactured for playback at 33 r.p.m. or 78 r.p.m. Records currently manufactured to be played back at 45 r.p.m., have larger center holes and consequently in order to properly support these records on a conventional record player, an adapter must either be placed in the relatively large center hole of the 45 r.p.m. record or on the center spindle of the record player. Placing such an adapter on the relatively large center hole of 45 r.p.m. records necessitates either securing an adapter to each of the records or securing an adapter to a record before playing and removing it thereafter to place it in another record. Adapters also have been employed that are placed over the center spindle of a phonograph when it is desired to use 45 r.p.m. records and remove from the spindle and the record player in order to play 33 r.p.m. records.

For convenience and to obviate removing the adapter from the record player, adapters have been employed having legs which fit down in slots around the center spindle in a retracted position so as to permit playing of the relatively small center hole records on the center spindle. When it is desired to play large center hole records this adapter is pulled upwardly and rotated about a vertical axis so that indentations in the legs of the adapter support the adapter in a projected position. In the projected position such adapters project above the record supporting surface to provide a large spindle for 45 r.p.m. records. In either placing the large center hole record over the adapter or removing it therefrom, or during the play thereof, such adapters are easily accidentally rotated back into the slots so as to move the adapter downward to the retracted position below the record supporting surface. This can result in a continual annoyance and even damage to the 45 r,p,m. records being played.

One feature of the present invention is a record player adapter which is rotated from its retracted position to the projected position, for play with large center hole records, so that in the retracted position one side of the record adapter is facing downwardly while in the projected play position the same side of the adapted is facing upwardly. More specifically, such rotation is about a generally horizontal axis. As a result, placing a large center hole record on the adapter, playing the record and removing the record are less likely to accidentally rotate the adapter into its retracted position.

Accordingly, an object of my invention is to provide a new and improved phonograph record adapter which enables both the play of relatively small center hole records as well as large center hole records on a conventional phonograph.

Another object of the invention is the provision of a record adapter for selectively providing a spindle for large center hole records by a relatively simple movement of the adapter.

Still another object of the invention is to provide an adapter that is mounted on a phonograph record player turntable and enables selective playing of larger center hole diameter records and is relatively stable in its projected position when playing large center hole records.

Further objects and advantages of the invention will become apparent as the following description proceeds and features of novelty which characterize the invention will be pointed out in particularity in the claims annexed to and forming a part of this specification.

For a better understanding of the invention, reference may be made to the accompanying drawings, in which.

Figure 2:
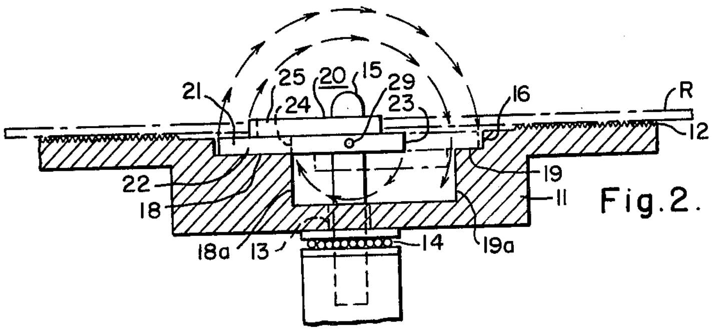
FIG. 2 illustrates a cross-sectional view taken along lines II—II of FIG. 1.
Figure 4:
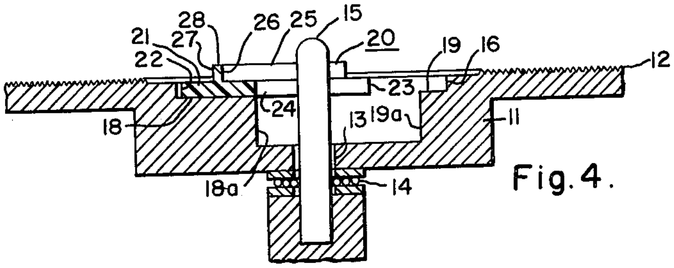
FIG. 4 illustrates a cross-sectional view taken along lines IV—IV.

Referring to the drawing, there is illustrated a record player turntable 10 which utilizes an adapter 20 embodying the invention. A conventional tone arm and cartridge 10*a* is employed for use with turntable 10. The circular turntable 10 has a base or main section 11 with an upper circular supporting surface 12. This supporting surface can either be flat or as employed in many record players a grooved surface, as shown in FIG. 2 to apply frictional contact with the lower portion of the record R. As is in conventional record players, the center of the turntable 10 has a center aperture 13 shown in FIG. 4 which is adapted to receive the center spindle 15. As bearing 14 supported by an end hearing 14*a*, surrounds the center spindle 15 to provide vertical support for the turntable and also provide the rotatable mounting for rotating the turntable. The end bearing 14*a* supports spindle 15 for rotation. Bearing 14*a* is supported by some conventional means on the record player. Conventional drive means (not shown) such as an idler wheel driven by a motor, to drive the inside rim of the turntable can be employed or other suitable means can be employed for rotating the turntable 10 at the proper desired speed. When the turntable is mounted as shown in FIG. 4, the center spindle 15 extends upwardly a substantial distance beyond the record supporting surface 12 and is dimensioned so as to receive small center hole aperture records such as 33 r.p.m. or 78 r.p.m. records.

Extending downwardly from and into the base member 11 is a generally circularly shaped recess 16. The recess 16 is concentric with the axis of the rotation of the turntable and consequently concentric with the axis of the spindle 15. Extending downwardly from the top surface of the base member 11 and into the circular recess 16, is a pair of rectangularly shaped recesses 17. The recesses 17 are diametrically disposed relative to spindle 15. At a predetermined distance downwardly from the top surface of base member 11, in circular recess 16 are two planar horizontal semicircular surfaces 18 and 19 which extend into the circular recess 16 and interrupts its cylindrical shape, The recess 16 extends downwardly beyond the planar surfaces 18 and 19 at a predetermined distance as will be described later.

Figure 1:
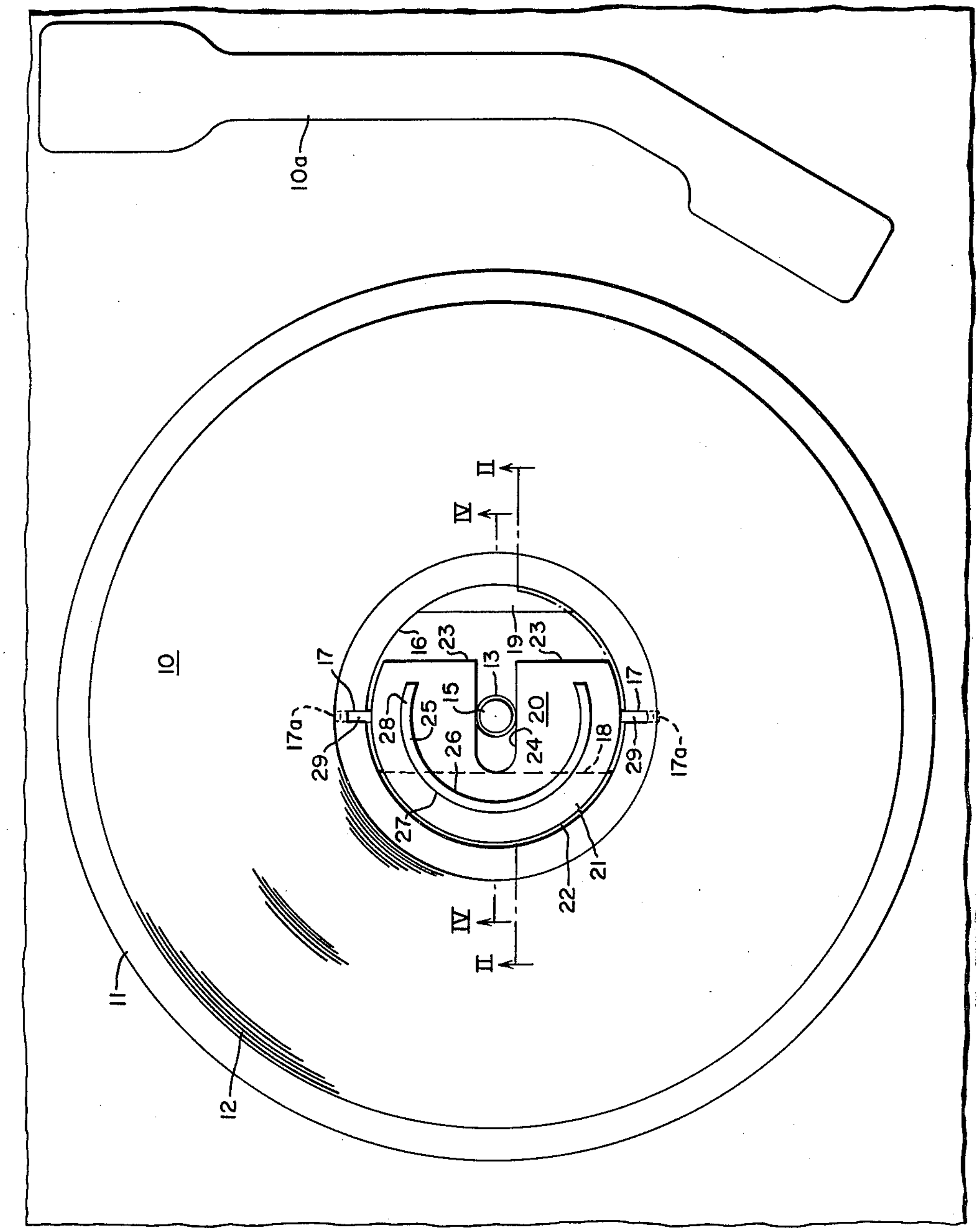
FIGURE 1 illustrates a top plan view of a phonograph turntable employing an adapter embodying the invention.
Figure 3:
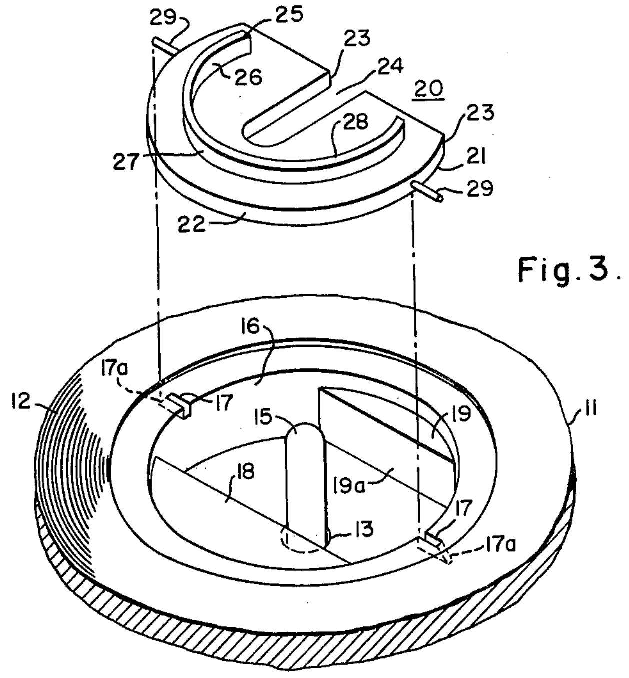
FIG. 3 illustrates a layout isometric view of the record player adapter illustrated in FIGS. 1 and 2.

The adapter 20 is shown in an isometric view in FIG. 3, and in a plan view in FIG. 1. The adapter 20 includes a C-shaped base member 21 having upper and lower parallel surfaces, and a circular peripheral edge 22 around three sides thereof with two parallel planar edges 23 on the other side. A slot 24 extends inwardly of the planar edges 23 and is perpendicular thereto. Mounted on the upper surface of the C-shaped member 20, is a circularly disposed C-shaped rim 25 that extends upwardly therefrom as shown in FIGS. 2 and 3. The cylindrical inner surface 26 and outer cylindrical surface 27 of the C-shaped rim 25, are concentrically disposed with respect to each other as well as with respect to the peripheral edge 22. The surfaces 26 and 27 describe at least slightly more than 180° of a circle and are perpendicular to base 21. The top surface 28 of rim 25 also describes a circle of at least slightly more than 180° of a circle. The top surface 28 of rim 25 is parallel to the top surface of member 21 and spaced a predetermined distance therefrom.

The adapter 20 can be made of a plastic material which is relatively easy to fabricate and is suitably strong yet has some resiliency. The adapter 20 is mounted for rotation on turntable 10 by circular pins 29 that are extended outwardly from the circular edge 22 as shown in FIGS. 1 and 3. These pins 29 are diametrically disposed with respect to the edge 22 as shown in FIG. 1. Likewise, the recesses 17 are diametrically disposed relative to the axis of spindle 15. The adapter 20 is lowered into the recess 16 so that pins 29 are inserted into the recesses 17. Some suitable means, such as a snap fit is employed to secure the pins 29 for rotation in the recesses 17. A snap fit is shown in the drawing with the outer walls **17*a* of recesses 17 tapering outwardly and downwardly as shown in FIG. 3. Other suitable methods can be used to mount the adapter for rotation on turntable 10. When so mounted the pins 29 are diametrically disposed relative to the spindle 15 and the circular edge 22 as well as the inner and outer surfaces 26 and 27 describe circles which are concentric with the axis of center spindle 15, as shown in FIG. 1. As stated above, the circular recess 16 is concentric with the axis of spindle 15 and has a radius of curvature sufficiently larger than the radius of curvature of the peripheral edge 22 so as to allow rotation of the adapter on pins 29**.

The adapter 20 is illustrated in solid lines in FIGS. 1, 2 and 4 in its projected position wherein the circular rim 25 extends upwardly above the supporting surface 12 of the turntable 10. In this portion, the turntable can then play records having large center holes such as 45 r.p.m. holes by using the circular rim 25 as the spindle. In the projected position as shown in FIGS. 2 and 4, a portion of the lower surface of the C-shaped base 21 is supported by the horizontal semicircular supporting surface 18, and the upper surface of base 21 is slightly below supporting surface 12. It will be noted that in this projected position, the placing of the record on the turntable, the playing of the record and the moving of the record will not tend to return the adapter 20 into its retracted position since this can only be done by rotating the adapter upwardly in a clockwise direction as shown in FIG. 2 toward the record. The outer surface 28 has a radius of curvature which is slightly less than the radius of curvature of large center hole records which are to be played in the projected position. More specifically, the radius of curvature of surface 28 would be slightly less than the large holes of the present day 45 r.p.m. records. It will be noted that since this surface 28 extends more than 180°, such a record is adequately secured in place in a horizontal plane.

When it is desired to play small center hole records such as 33 r.p.m. records, the adapter 20 is returned to a retracted position shown in dotted lines in FIG. 2. In order to reach the retracted position, a simple single rotary movement of the adapter about the horizontal axis of pins 29 is accomplished as shown by the arrow in FIG. 2. The recess 24 is of sufficient depth relative to the height of the spindle 15 so that the adapter can rotate over the spindle to the retracted position shown in dotted lines in FIG. 2. In retracted position no portion of the adapter is above the upper supporting surface 12 so that small center hole records such as 33 r.p.m. records can be easily fitted on to the small center spindle 15. As shown in FIG. 2, the height of the C-shaped rim 25 and its radius of curvature are such that in the retracted position the former upper surface of base member 21 will rest on horizontal stop surface 19, and C-shaped rim 25 will extend vertically downwardly into the bottom portion of recess 16. Also as evident in FIG. 2, the distance between the axis of rotation of the pins 29 and the edge surfaces 23 is less than the height of vertical recess walls **18*a* and 19*a* so that the 180° rotary movement of edges 23** will be possible.

It will be understood that in the retracted position as shown in FIG. 2 in dotted lines, the new upper surface of the base 21 can be either parallel with or below the record supporting surface 12 of turntable 10. To provide the greater degree of tolerance, it is preferred that this surface be slightly below the record supporting surface 12.

It will be noted that in both the projected and retracted positions of the adapter, the center gravity of the adapter 20 is towards the surface (18 or 19) that is supporting the adapter. As such, the adapter by its own weight will tend to remain in the position, and resist other forces tending to rotate it to another position.

While there have been shown and described what are at present considered to be the preferred embodiment of the invention, modifications thereto will readily occur to those skilled in the art. It is not desired, therefore, that the invention be limited to the specific arrangements shown and described and it is intended to cover in the appended claims all such objects as fall within the true spirit and scope of the invention.

We claim as our invention:

1. A phonograph record player including a rotatable turntable having an upper supporting surface to support a record having an aperture of a predetermined size and shape therein, a record adapter pivotally mounted to said turntable for pivotally rotating about a horizontal axis from a first projecting position wherein one side of said adapter has at least a portion extending upwardly above said supporting surface and dimensioned for guiding engagement with a record, said adapter being pivotal from said first position to a retracted second position wherein said portion extends downwardly below said upper supporting surface.

2. A phonograph record playing device including a turntable having an upper supporting surface, an adapter having a first and second major surface pivotally mounted to said turntable in a retracted position with said first major surface below said second major surface and said supporting surface to enable uniform support of a record having a small center hole by said supporting surface, said adapter being pivotally rotatable about a horizontal axis to a projecting position wherein said first major surface is above said second major surface and said first major surface having at least a portion thereof extending above said supporting surface and dimensioned for guiding engagement with records having larger center holes.

3. A phonograph record playing device including a turntable having an upper supporting surface, said turntable being rotatable about an axis, a spindle concentric with said axis and extending upwardly from said supporting surface for guiding engagement with records having small center holes, and an adapter having a first and a second major surface, said adapter pivotally mounted to said turntable in a retracted position with said first major below said second major surface for playing records having small center holes on said spindle, said adapter being pivotal about a horizontal axis to a second projecting position wherein at least a portion of said first major surface is above said second major surface and said supporting surface and defining a cylinder for guiding engagement with records of larger center holes.

4. A phonograph record playing device including a turntable having an upper supporting surface for supporting a record thereon having large center holes or small center holes, said turntable being rotatable about an axis, a spindle concentric with said axis extending upwardly from said supporting surface for guiding engagement with records having small center holes, an adapter having a first and a second major surface, first stop means, and second stop means mounted on said turntable, said adapter pivotally mounted on said turntable in a retracted position with said first major surface in contact with said first stop means and below said second major surface and said supporting surface, said adapter being pivotal over said spindle to a projecting position with said first major surface is above said second major surface and said second major surface in contact with said second stop means, said adapter having at least a portion extending above said supporting surface in said projected position that is dimensioned for guiding engagement with records having larger center holes.

5. A phonograph record playing device including a turntable having an upper supporting surface for supporting a record, said turntable being rotatable about an axis, a spindle on said turntable concentric with said axis and projecting above said supporting surface for guiding engagement with records having small center holes, a C-shaped adapter having a first major surface including side surfaces and a second major surface, said adapter normally pivotally mounted on said turntable in a retracted position with said first major surface below said second major surface and said supporting surface, said adapter being pivotal over said spindle to a projecting position wherein said first major surface is above said second major surface, and said side surfaces extending above said supporting surface defining a cylinder having a diameter larger than the diameter of said spindle for guiding engagement with records having larger center holes.

6. A phonograph record playing device including a turntable having an upper supporting surface for supporting a record, having a small or large center holes, said turntable being rotatable about an axis, a spindle mounted on said turntable and extending concentric with said axis and extending outwardly from said supporting surface, a C-shaped adapter having a first major surface including side surfaces and a second major surface, pivot means for pivotally mounting said C-shaped adapter about an axis located vertically closer to said second major surface than said first major surface, said adapter positioned in a retracted position with said first major surface below said second major surface, stop means contacting said second major surface to maintain said adapter in said retracted position, said adapter being pivotal over said spindle to a projecting position wherein said side surfaces are above said second major surface and said supporting surface, and said side surface defining a cylinder for guiding engagement with records having large center holes.

References Cited by the Examiner

UNITED STATES PATENTS 2,799,509 7/57 Thomas ---------------- 274—39

FOREIGN PATENTS 712,285 7/54 Great Britain.

NORTON ANSHER, *Primary Examiner.*